United States Patent [19]

Minemura

[11] 4,392,160
[45] Jul. 5, 1983

[54] PLAYBACK SYSTEM FOR VIDEO DISK HAVING PLURAL INFORMATION TRACKS

[75] Inventor: Koichi Minemura, Fukaya, Japan

[73] Assignee: Tokyo Shibaura Denki Kabushiki Kaisha, Kawasaki, Japan

[21] Appl. No.: 134,324

[22] Filed: Mar. 26, 1980

[30] Foreign Application Priority Data

Mar. 27, 1979 [JP] Japan .................................. 54-36120
Mar. 27, 1979 [JP] Japan .................................. 54-36121

[51] Int. Cl.³ ........................ H04N 5/80; G11B 21/10
[52] U.S. Cl. ................................... 358/327; 358/312; 358/330; 369/43
[58] Field of Search ................. 358/4, 8, 128.5, 128.6, 358/310, 322, 330, 335, 341, 342, 343; 360/77, 10.1, 10.2, 10.3, 19.1; 369/43, 44, 93, 94, 96, 128

[56] References Cited

U.S. PATENT DOCUMENTS

| | | | |
|---|---|---|---|
| 3,363,054 | 1/1968 | Mason .................................. | 358/128.6 |
| 3,371,154 | 2/1968 | Frohbach et al. ............... | 358/128.6 |
| 3,435,135 | 3/1969 | Yasuoka et al. . | |
| 3,840,893 | 10/1974 | Jacoby et al. ......................... | 360/77 |
| 3,864,740 | 2/1975 | Sordello et al. ....................... | 360/77 |
| 3,911,476 | 10/1975 | Keizer .................................... | 358/4 |
| 3,930,117 | 12/1975 | Clemens et al. . | |
| 4,068,258 | 1/1978 | Bied-Charreton et al. .......... | 358/310 |
| 4,119,812 | 10/1978 | Fox ......................................... | 369/43 |
| 4,161,752 | 7/1979 | Basilico . | |
| 4,208,671 | 6/1980 | Ozawa et al. ........................... | 358/4 |

FOREIGN PATENT DOCUMENTS

| | | |
|---|---|---|
| 2262326 | 7/1974 | Fed. Rep. of Germany . |
| 1298794 | 12/1972 | United Kingdom . |
| 1372416 | 10/1974 | United Kingdom . |
| 1400274 | 7/1975 | United Kingdom . |

Primary Examiner—Bernard Konick
Assistant Examiner—Donald McElheny, Jr.
Attorney, Agent, or Firm—Finnegan, Henderson, Farabow, Garrett & Dunner

[57] ABSTRACT

A video disc has first and second information tracks adjacently formed thereon, and first and second FM signals with different frequency bands are recorded on the first and second information tracks, respectively. A common stylus simultaneously traces the first and second information tracks, and a signal detector circuit coupled with the stylus detects the first and second FM signals. The first and second FM signals are separated by first and second filter circuits, and applied respectively to first and second rectifying circuits, where DC voltage signals corresponding to the carrier levels of the detected first and second FM signals are produced. These DC voltage signals are compared by a voltage comparator circuit to control a tracking compensating device. Demodulator circuits to demodulate the information signals recorded on the first and second information tracks are connected to the first and second filter circuits.

2 Claims, 10 Drawing Figures

PLAYBACK SYSTEM FOR VIDEO DISK HAVING PLURAL INFORMATION TRACKS

BACKGROUND OF THE INVENTION

This invention relates to a video disc on which video and audio information signals are recorded and a playback system for the video disc.

There is generally known video disc playback systems which reproduce FM signals including a video information signal (including luminance signal and chrominance signal components) and an audio information signal from a rotating video disc which has a spiral information track formed of pits corresponding to the FM signals, by bringing a stylus into contact with the information track to detect changes in capacitance between an electrode formed on one surface of the stylus and an electrode formed on the video disc which are caused by the existence of the pits. The video and audio information signals are separately extracted from the reproduced FM signals by the frequency separation method, and are respectively subjected to additional demodulation.

There are grooved and ungrooved type video discs. In a grooved type video disc, a groove is formed along a track, and pits are defined at the bottom of the groove. In the case of such grooved type disc, therefore, the stylus traces the groove, so that tracking servo is not required. Since the stylus traces the groove, however, reproduction from the video disc is limited to a normal playback mode; it is difficult to achieve picture reproduction in special playback modes, such as quick-motion playback, slow-motion playback, still picture playback, etc.

In order to enable picture reproduction in the special playback modes, there has been developed such an ungrooved type video disc as shown in FIG. 1. In FIG. 1, numeral 11 designates a disc base formed of synthetic resin on which pits 12 are formed along a recording track. Signal information is recorded as changes of the length of the pits along the longitudinal direction of the track and the space between the pits. A metal coating layer 13 is formed on the disc base with the pits thereon, and a dielectric layer 14 is formed on the metal coating layer 13. The dielectric layer 14 is coated with a smoothing agent 15 so that the surface of the video disc may be smooth. Numeral 16 denotes a sapphire or diamond stylus. An electrode 17 is formed by evaporation on a surface of the stylus 16 at right angles to the longitudinal direction of the recording track and parallel to the traverse direction thereof. The capacitance between the electrode 17 on the stylus 16 and the electrode 13 on the disc base changes according to the recording information as the video disc rotates. If the disc 11 is formed of a conducting plastic material, the metal coating layer 13 and dielectric layer 14 may be removed.

In such ungrooved video disc, although picture reproduction in the special modes may be easily performed due to its flat or even surface, a tracking servo system is essential to the accurate tracing of the recording track. For tracking servo, there has been developed a video disc in which tracking information pits are formed between information tracks for the main signals, the video and audio signals. Such video disc would, however, be too complicated to be manufactured with ease, and require sophisticated signal processing circuits for tracking servo.

According to the prior art video disc signal recording system, video signal information (including luminance and chrominance signal components) and audio signal information are simultaneously recorded on a common track. An FM wave bearing the audio signal information is recorded at an attenuated level and with a different frequency band, as compared with an FM wave bearing the video signal information. In this case, a narrower frequency band is allocated to the audio signal information as compared with the case of television or FM radio broadcasting. The low recording level of the audio signal FM waves for the prevention of interference between the video and audio information signals constitutes a hindrance to reproduction of high-quality audio signals.

The chrominance signal component is non-interferringly superposed on the luminance signal component, and then recorded on the video disc in the form of an FM signal. In order to reproduce a color picture on a color picture tube, the luminance and chrominance signal components are separated from each other after FM demodulation, the chrominance signal component is frequency-converted, and these two signal components are recomposed into a form suited for the reproduction on the color picture tube. The separation between the chrominance and luminance signal components requires a complicated and expensive comb filter.

SUMMARY OF THE INVENTION

An object of this invention is to provide a video disc enabling tracking servo with use of simple circuits and a playback system for the video disc.

According to this invention, first and second information tracks are adjacently formed on a video disc. According to a first embodiment of the invention, a video information signal is recorded on the first information track by frequency modulation, while an audio information signal is recorded on the second information track by frequency modulation in a different frequency band from that for the video information signal. According to a second embodiment, a chrominance information signal is recorded on the first information track by frequency modulation, while a luminance information signal and an audio information signal are recorded on the second information track by frequency modulation in a different frequency band from that for the FM signal on the first track.

In order to reproduce the video disc according to this invention, there is used a stylus capable of simultaneously tracing the first and second information tracks. The FM signals recorded on the first and second information tracks are detected by a signal detector circuit coupled to the stylus, and these detected FM signals are separated from each other by first and second filter circuits. For tracking servo, the separated FM signals are supplied to first and second rectifying circuits, where DC voltage signals corresponding to carrier levels of the reproduced FM signals are produced. These DC voltage signals are supplied to a voltage comparator circuit, and a tracking servo device which responds to the voltage comparator circuit keeps the stylus in its proper tracing position.

Demodulator circuits for the information signals recorded on the first and second information tracks are connected to the first and second filter circuits.

BRIEF DESCRIPTION OF THE DRAWINGS

This invention can be more fully understood from the following detailed description when taken in conjunction with the accompanying drawings, in which.

DESCRIPTION OF THE PREFERRED EMBODIMENTS

Figure 1:
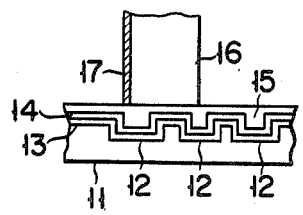
FIG. 1 is a schematic sectional view of a prior art video disc with flat surface.
Figure 2:
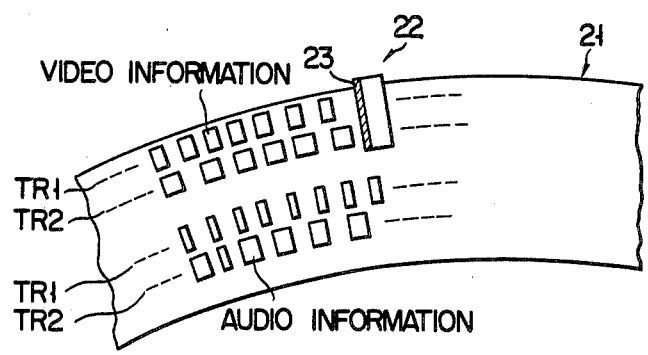
FIG. 2 is a schematic plan view of a video disc according to an embodiment of this invention.
Figure 3:
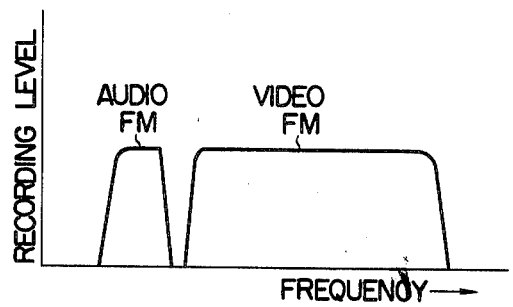
FIG. 3 schematically shows the frequency spectrum of FM signals recorded on first and second tracks of the video disc of FIG. 2.

Referring now to FIG. 2 showing a flat-surface ungrooved video disc according to a first embodiment of this invention, two spiral information tracks TR1 and TR2 with the same width are adjacently formed on the video disc 21. On the information track TR1, there are formed pits which correspond to FM waves with a carrier frequency-modulated by a video information signal (luminance signal and chrominance signal components), while on the information track TR2, there are formed pits which correspond to FM waves with a carrier frequency-modulated by an audio information signal. The video- and audio-information FM waves may be formed in the same manner as the conventional manner, except for that they are recorded on separate tracks. As shown in FIG. 3, moreover, the video- and audio-information FM waves are recorded at the same recording level, that is, the same amplitude level with respect to their carriers. The audio information signals may be recorded with a wider frequency band as compared with the conventional case.

In order to pick up information signals from such video disc, there is used a stylus 22 with a width to cover the information tracks TR1 and TR2. On the stylus 22, there is formed an electrode 23 which is just wide enough to cover both those tracks. Namely, the FM waves on the tracks TR1 and TR2 are detected by a common stylus.

Figure 4:
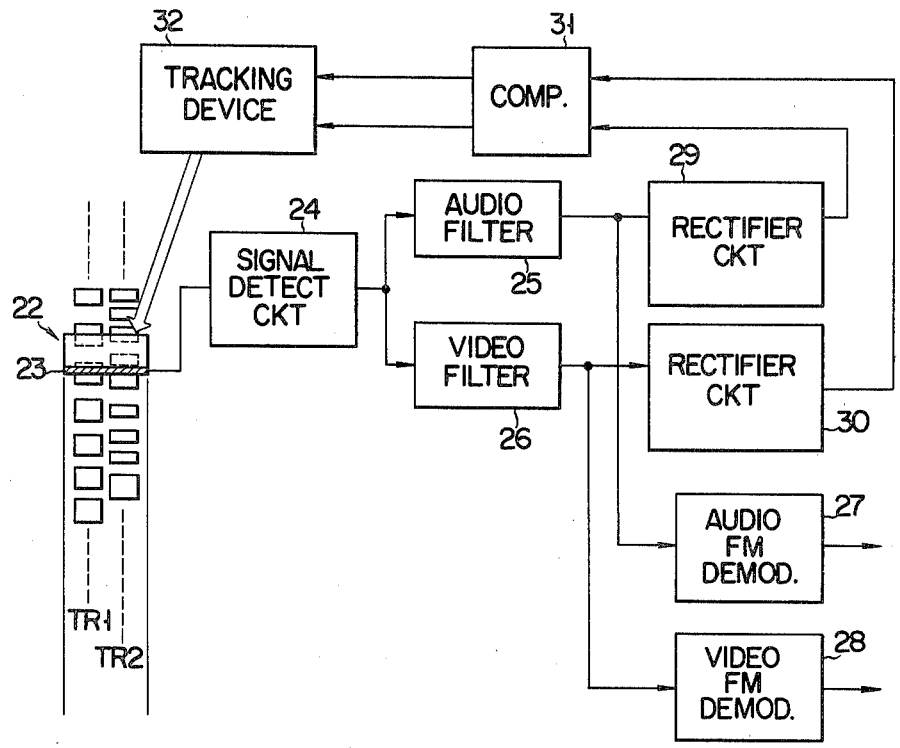
FIG. 4 shows a playback system for the video disc of FIG. 2.

FIG. 4 shows a playback system including a tracking servo system which uses the aforesaid video disc and stylus. The stylus electrode 23 is connected to a conventional FM signal detector circuit 24, where the video- and audio-information FM waves are detected. The video- and audio-information FM waves are separated from each other by an audio filter 25 and a video filter 26. The output of the audio filter 25 is coupled to an audio FM demodulator circuit 27, where an audio signal component is demodulated. The output of the video filter circuit 26 is coupled to a video FM demodulator circuit 28, where a video signal component is demodulated.

For tracking servo, the outputs of the audio and video filters 25 and 26 are respectively coupled to rectifying circuits 29 and 30 for rectifying the signals corresponding to the pits and smoothing rectified signals with a time constant necessary for tracking servo. Since the video and audio signals are recorded at the same recording level, as mentioned before, the rectifying circuits 29 and 30 produce DC voltages of the same magnitude in response to the carriers of the demodulated audio and video FM signals when the stylus 22 traces the information tracks TR1 and TR2 correctly, that is, when the electrode 23 covers both the overall widths of the two information tracks TR1 and TR2. The output voltages of the rectifying circuits 29 and 30 are compared by a voltage comparator 31 two outputs of which are connected to a tracking compensating device 32 having a pair of tracking compensating coils. In response to the voltage comparator 31, as mentioned later, the pair of tracking compensating coils of the tracking compensating device 32 operate on a cantilever with the stylus attached to its tip end and with an iron piece formed thereon at a position facing the compensating coils, thereby keeping the stylus in its correct tracing position.

If the stylus 22 is shifted from the correct tracing position, that is, if the overall width of the track TR1 and TR2 is not covered with the stylus 22, then there will be caused a difference in the amplitude level between carriers appearing at the respective outputs of the audio and video filters 25 and 26. Accordingly, the magnitudes of the output voltages of the rectifying circuits 29 and 30 will be different, so that the balance between the two output voltages of the voltage comparator 31 will be lost. In response to the voltage comparator 31, the pair of tracking compensating coils are energized differently. As a result, the cantilever is attracted toward one of the tracking compensating coils, thereby restoring the stylus to the correct tracing position.

According to above-mentioned embodiment of the invention, the audio and video tracks are separately adjacently formed, so that tracking servo may easily be achieved with use of simple circuit arrangement by simultaneously tracing the audio and video tracks with the common stylus and comparing the level between the reproduced audio and video carriers. Further, the recording level for the audio information can be raised, so that audio playback with a high S/N ratio can be effected.

Although there has been described a case where the widths of the audio and video information tracks, as well as the recording levels for the audio and video information, are the same, this invention is not limited to such case. For example, the recording level of the audio information may be half ($-6$ dB) that of the video information. In this case, the carrier level of the reproduced audio information is half that of the video information. However, the output voltages of the rectifying circuits 29 and 30 produced when the stylus traces both the tracks correctly may be made equal by only providing a ½-voltage attenuator on the input side or output side of the rectifying circuit 30. Alternatively, the width of the audio information track may be made half that of the video information track when the audio and video information are recorded at the same recording level. Also in this case, the carrier level of the reproduced audio information is approximately half that of the video information, so that it is necessary to provide a voltage attenuator on the input or output side of the rectifying circuit 30. Even, if the width of the audio information track or the recording level for the audio information is reduced, it will be possible to perform audio playback with a higher S/N ratio as compared with the case of the prior art system.

Figure 5:
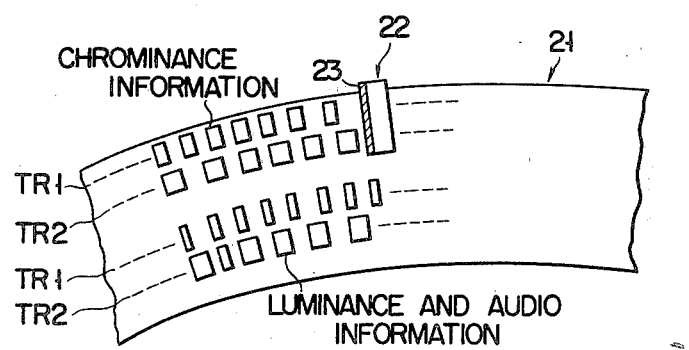
FIG. 5 is a schematic plan view of a video disc according to another embodiment of the invention.

FIG. 5 shows a flat-surface ungrooved video disc according to another embodiment of the invention. In this video disc, two adjacent spiral tracks TR1 and TR2 are formed with the same width. FM waves bearing chrominance information are recorded on the track TR1, while FM waves bearing luminance and audio information are recorded on the track TR2. Like the case of the video disc of FIG. 2, both these tracks are simultaneously traced by a stylus 22 with an electrode 23.

Figure 6:
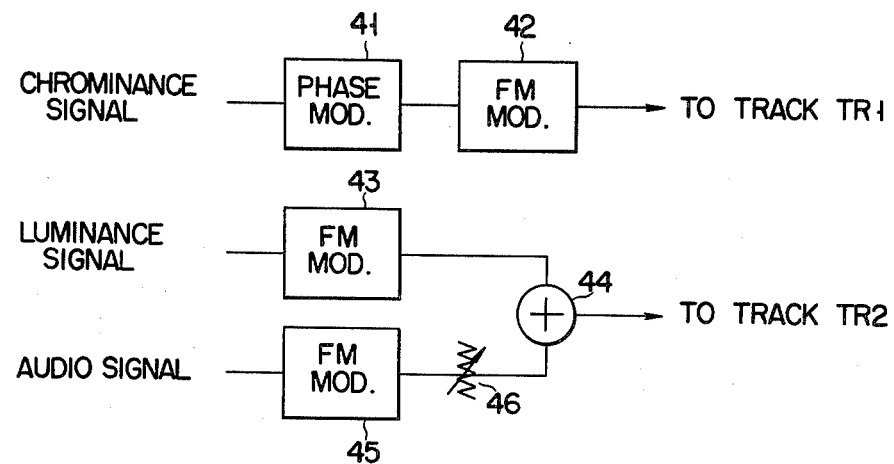
FIG. 6 is a block diagram for the production of FM signals to be recorded on first and second tracks of the video disc of FIG. 5.
Figure 7:
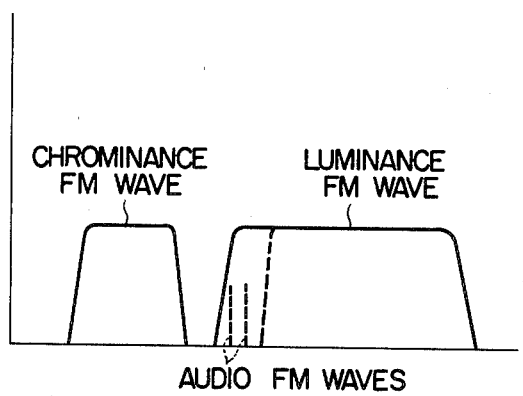
FIG. 7 schematically shows the frequency spectrum of FM signals recorded on the first and second tracks of the video disc of FIG. 5.

The FM waves recorded on the tracks TR1 and TR2 may be produced in such a manner as shown in FIG. 6. That is, a chrominance signal is applied to a phase modulator 41 to phase-modulate a color subcarrier signal with a given frequency. The phase-modulated color subcarrier signal is applied to a frequency modulator 42 to frequency-modulate a color main carrier with a given frequency. A chrominance FM signal obtained in this manner is recorded on the track TR1 through a suitable band-pass filter (not shown). On the other hand, a luminance signal is applied to a frequency modulator 43 to frequency-modulate a luminance carrier signal with a given frequency, and a luminance FM signal obtained is applied to an adder 44 through a suitable band-pass filter (not shown). As for an audio signal, it is applied to a frequency modulator 45 to frequency-modulate an audio carrier with a given frequency, and an audio FM signal obtained is attenuated to a suitable level by an attenuator 46, band-limited by a suitable band-pass filter (not shown), and applied to the adder 44. The output of the adder 44 is recorded on the track TR2. In recording stereophonically related audio signals, there may be used two audio carriers with different frequencies. The frequency spectrum of recording signals thus obtained is schematically shown in FIG. 7. In the present embodiment, the chrominance and luminance FM waves are recorded at the same recording level or carrier amplitude level.

Figure 8:
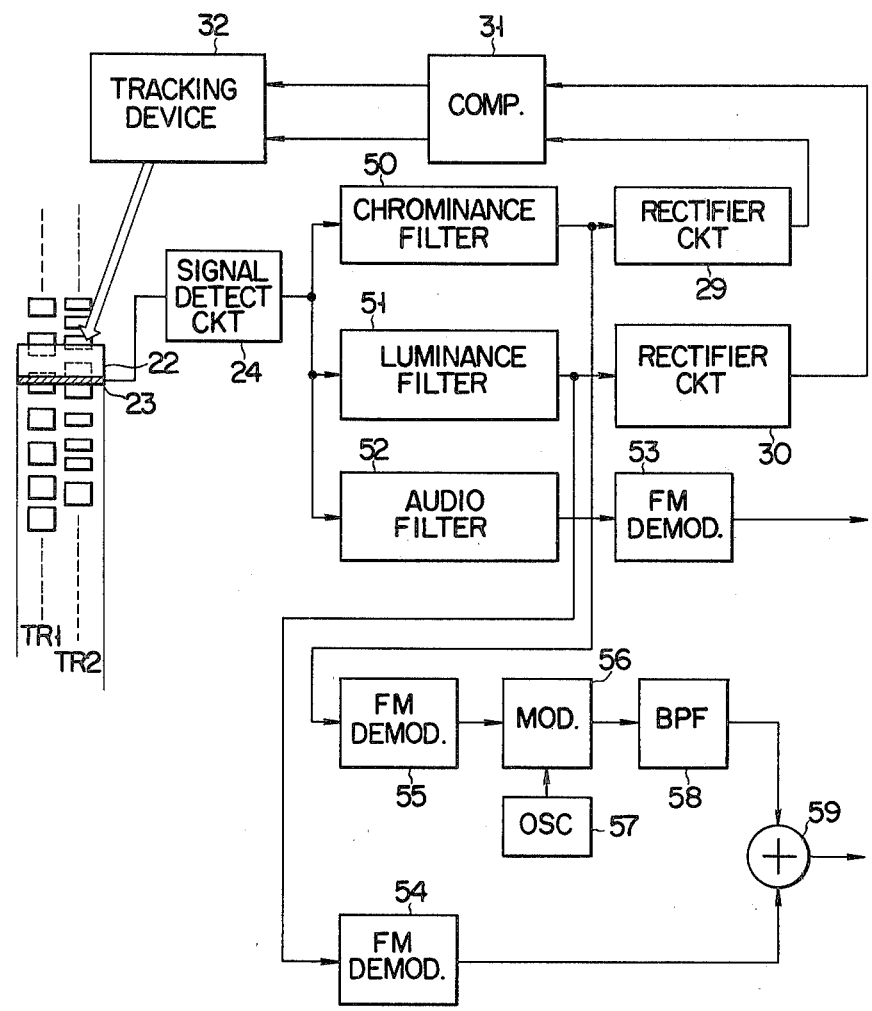
FIG. 8 shows a playback system for the video disc of FIG. 5.

FIG. 8 shows a playback system for the video disc shown in FIG. 5. In this figure, like reference numerals refer to the same parts as shown in FIG. 4. Between a signal detector circuit 24 and a rectifying circuit 29, there is connected a chrominance filter 50 to extract the chrominance signal of FIG. 7 from the output signal of the signal detector circuit 24. Between the signal detector circuit 24 and a rectifying circuit 30, on the other hand, there is connected a luminance filter 51 to extract the luminance FM signal from the output signal of the signal detector circuit 24. Accordingly, in this embodiment, tracking servo is executed in accordance with the carrier amplitude level ratio between the reproduced chrominance and luminance FM signals.

An audio filter 52 to extract the audio FM signal is connected to the output of the signal detector circuit 24. The extracted audio FM signal is applied to an FM demodulator 53, where the audio signal is recovered.

The output signal of the luminance filter 51 is applied to a luminance FM demodulator 54, where the luminance information signal is recovered. Moreover, the output signal of the chrominance filter 50 is applied to an FM demodulator 55, where the chrominance information signal is recovered. The recovered chrominance information signal is applied to a balanced modulator 56 to which the output signal of an oscillator 57 with a given frequency is supplied, and is converted into a 3.58 MHz suppressed-carrier chrominance signal fit for the NTSC signal. The 3.58 MHz suppressed-carrier chrominance signal is applied through a suitable band-pass filter 58 to an adder 59 to which the luminance signal from the FM demodulator 54 is applied, where it is combined with the luminance signal into a form suited for reproduction on a color television set.

According to the above-mentioned second embodiment of this invention, the chrominance and luminance FM signals are recorded with different frequency bands on the separate tracks, so that it it unnecessary to use a comb filter of sophisticated construction for separating the luminance and chrominance signals from each other which is essential to the prior art system. Further, tracking servo can be achieved by the chrominance and luminance FM signals with the aid of the chrominance and luminance filters 50 and 51, the rectifying circuits 29 and 30, the comparator 31 and the tracking device 32.

Figure 9:
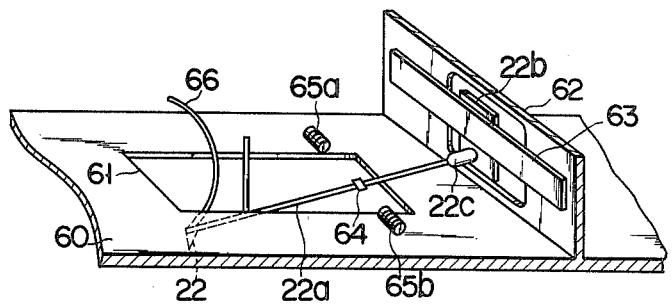
FIGS. 9 and 10 schematically show tracking compensating devices.

Referring now to FIG. 9, there will be described an example of a tracking compensating device which can be applied to this invention. The above-mentioned stylus 22 is attached to the tip end of the bottom side of a cantilever 22a obliquely penetrating an opening 61 in a base 60 of a pickup cartridge, and the other end of the cantilever 22a is fixed to an iron piece 22b by means of a damper 22c. The iron piece 22b is supported by an elastic belt 63 attached to an upright wall 62. An iron foil 64 is fixed to the cantilever 22a at its portion intersecting the opening 61. A pair of tracking compensating coils 65a and 65b are disposed on the base 60, facing each other with the iron foil 64 therebetween. According to such construction, if the stylus is biased from its correct tracing position, the tracking compensating coils 65a and 65b are differently energized as aforesaid. As a result, the iron foil 64 is attracted toward the compensating coil 65a or 65b, thereby restoring the stylus to the correct tracing position. The iron piece 22b is intended for jitter compensation, and a jitter compensating coil (not shown) is provided at the back side of the iron piece 22b. Numeral 66 designates an elastic lead wire attached to the electrode 23 of the stylus 22 and connecting the electrode with the signal detector circuit 24.

Figure 10:
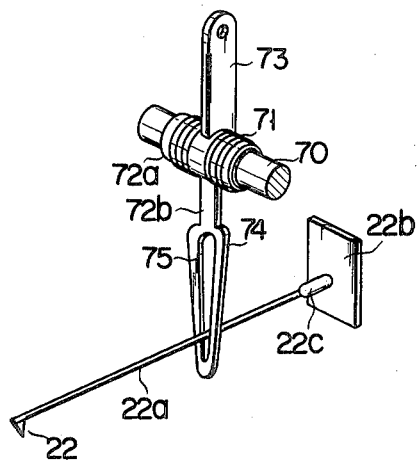

FIG. 10 shows another example of a tracking compensating device. In this example, a permanent magnetic 70 penetrates a bobbin 71 on which a pair of tracking compensating coils 72a and 72b are wound and which is supported by an elastic member 73. A member 74 with a slot 75 is disposed under the bobbin 71, and the cantilever 22a passes through the slot 75. In this construction, the bobbin 71 moves crosswise in response to a current flowing through the pair of compensating coils 72a and 72b, thereby biasing the cantilever.

Although in the above-mentioned embodiments, the audio signal component is recorded according to the FM modulation system, it may be digitized before the FM modulation. This invention may be applied to a video disc signal recording and playback system using laser light, as well as to a video disc signal recording and playback system utilizing capacitance. Furthermore, the invention may be applied not only to video discs with spiral information tracks but also to video discs with circular information tracks.

What is claimed is:

1. A playback system for a video disc which has first and second information tracks adjacently to each other, an FM signal frequency-modulated by a video information signal being recorded on said first information track and an FM signal frequency-modulated by an audio information signal being recorded on said second information track in a different frequency band from that for said FM signal on said first information track, comprising:

stylus means for simultaneously tracing said first and second information tracks;

signal detector means coupled to said stylus means for detecting the FM signal frequency-modulated by the audio information signal and the FM signal frequency-modulated by the video information signal;

first and second filter means coupled to said signal detector means for separating the FM signal frequency-modulated by the audio information signal and the FM signal frequency-modulated by the video information signal included in the output signal of said signal detector means from each other;

first and second rectifying circuit means connected respectively to said first and second filter means;

voltage comparator circuit means connected to said first and second rectifying circuit means;

tracking compensating means connected to said voltage comparator circuit means for restoring said stylus means to a correct tracing position thereof for said first and second information tracks when said stylus means is shifted from the correct tracing position;

first FM demodulator circuit means connected to said first filter means for demodulating the audio information signal; and second FM demodulator circuit means connected to said second filter means for demodulating the video information signal.

2. A playback system for a video disc which has first and second information tracks adjacently to each other, an FM signal frequency-modulated by a chrominance information signal being recorded on said first information track and an FM signal frequency-modulated by a luminance information signal being recorded on said second information track in a different frequency band from that for said FM signal on said first information track, comprising:

stylus means for simultaneously tracing said first and second information tracks;

signal detector circuit means coupled to said stylus means for detecting the FM signal frequency-modulated by the chrominance information signal and the FM signal frequency-modulated by the luminance information signal;

first and second filter means coupled to said signal detector circuit means for separating the FM signal frequency-modulated by the chrominance information signal and the FM signal frequency-modulated by the luminance information signal included in the output signal of said signal detector circuit from each other;

first and second rectifying circuit means connected respectively to said first and second filter means;

voltage comparator circuit means connected to said first and second rectifying circuit means;

tracking compensating means connected to said voltage comparator circuit means for restoring said stylus means to a correct tracing position thereof relative to said first and second information tracks when said stylus means is shifted from the correct tracing position; and circuit means connected to said first and second filter means for combining the chrominance and luminance information signals into a form suited for reproduction on a color television set.

* * * * *